UNITED STATES PATENT OFFICE.

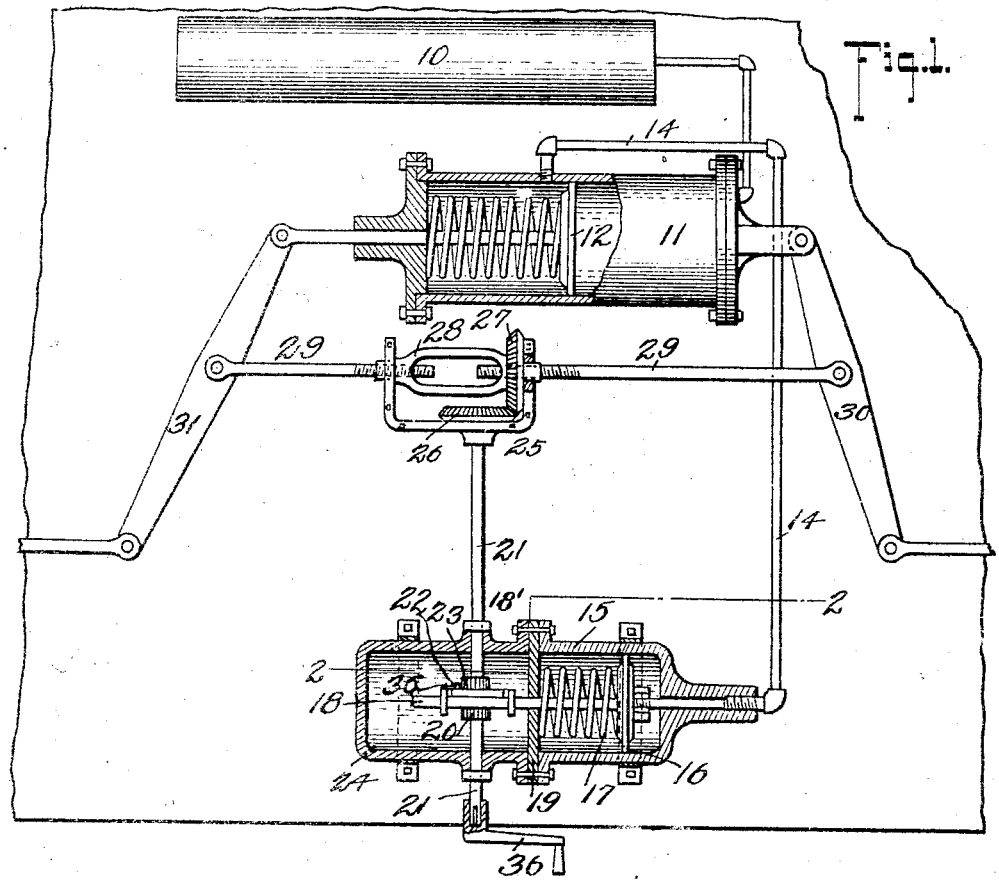

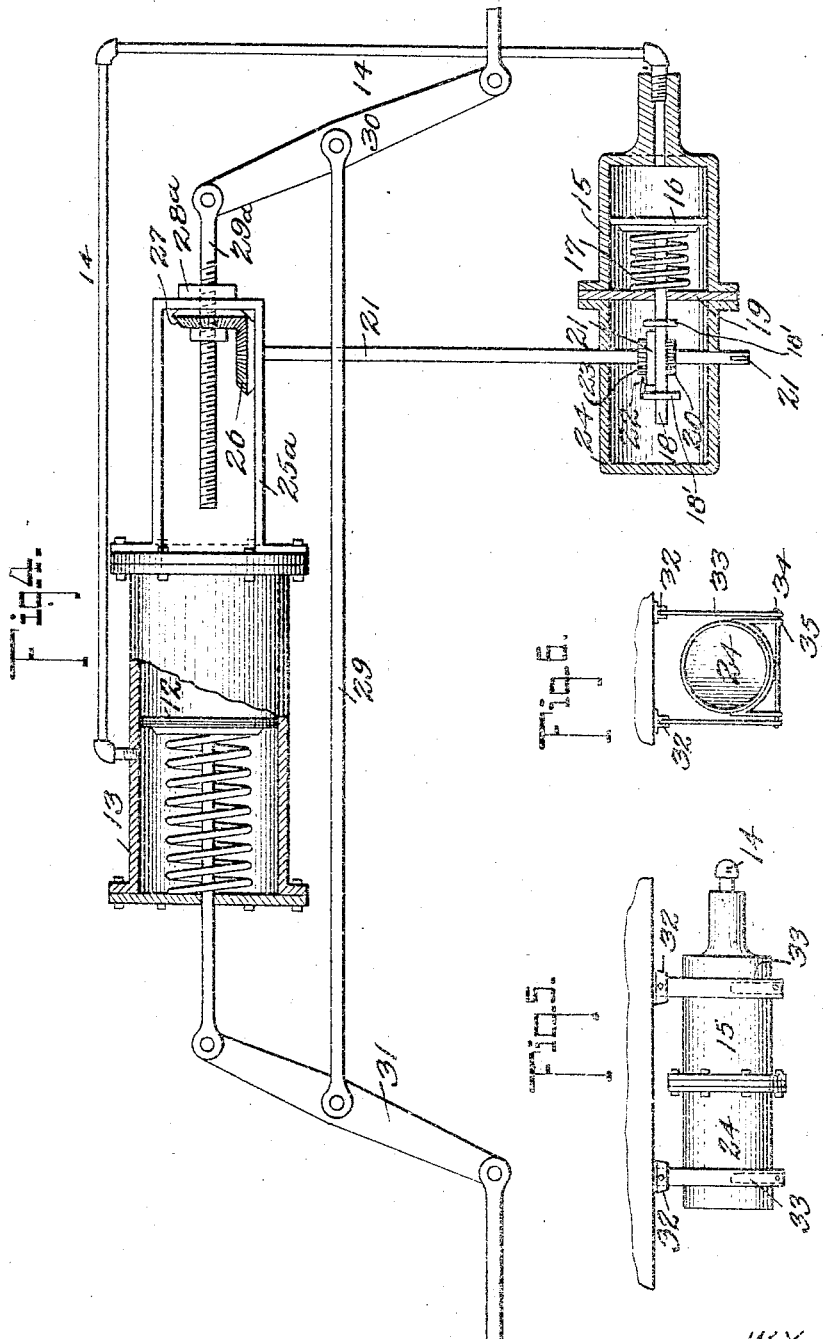

WILLIAM Y. MOFFAT, OF DUNMORE, PENNSYLVANIA, ASSIGNOR OF ONE-FOURTH TO ALEXANDER F. TRIMBLE, OF SCRANTON, PENNSYLVANIA.

SLACK-ADJUSTER.

1,060,481.  Specification of Letters Patent.  Patented Apr. 29, 1913.

Application filed May 25, 1911. Serial No. 629,341.

*To all whom it may concern:*

Be it known that I, WILLIAM Y. MOFFAT, a citizen of the United States, residing at Dunmore, in the county of Lackawanna and State of Pennsylvania, have invented new and useful Improvements in Slack-Adjusters, of which the following is a specification.

This invention is a simple mechanical appliance readily adapted to the different systems of brake equipment in use and provides a convenient method of adjusting the slack in the brake rods whenever necessary on account of wear and the consequent application of new brake shoes and this adjustment can be made by hand without the inconvenience and danger of the operator going underneath the cars, the adjusting rod extending for convenience of operation to the side of the car.

The method of application and description of the invention will be readily understood by referring to the drawings.

Figure 1 is a plan view of a brake system equipped with the improved slack adjuster as the same would be applied to an ordinary brake rod after the same has been cut and threaded parts being broken away and seen in horizontal section. Fig. 2 is a view partly in side elevation and partly in longitudinal section of the adjusting cylinder and coöperating parts, the parts being seen on enlarged scale. Fig. 3 is a transverse, vertical section taken approximately on the planes indicated by line 3—3 of Fig. 2. Fig. 4 is a view similar to Fig. 1 of a slightly modified embodiment. Figs. 5 and 6 are respective side and end elevations of the parts seen in Fig. 2.

In Fig. 1 the usual arrangement is shown of reservoir 10 connected by piping to triple valve and brake cylinder 11 in which piston 12 moves a predetermined distance in applying the brakes when port 13 in the side of the cylinder is uncovered thereby allowing pressure of air behind piston to pass into pipe 14 and thence to slack adjusting cylinder 15. This air pressure being admitted to cylinder 15 moves piston 16 forward compressing the spring 17, the construction and operation thus far being typical of slack adjusters now in use. At this point a new construction is introduced to operate in combination with the foregoing. Rack rod 18 is attached to piston 16 to move in connection therewith through the head of cylinder 10 and in its movement the teeth of rack rod 18 engages the teeth of rack wheel 20 for rotation to the right or left respectively as piston 16 moves forward by air pressure introduced into cylinder 10 or is returned to its normal position by expansion of spring 17 upon the release of the air pressure. Rack rod 18 is held in a horizontal position to engage its teeth with those of pinion 20 by suitable guides 18', 18' extending from the interior of the wall of casing 24 as may be necessary. Pinion 20 is provided with a rim or flanged portion to the rear of which flange 20' is attached pawl 22 for engagement with the teeth of ratchet wheel 23 keyed to shaft 21.

In the forward movement of piston 16 rack wheel 20, which runs loose on shaft 21, is turned to the left by rack rod 18 and pawl 22 moves over the teeth of ratchet wheel 23 without rotation of the latter but on the return of piston 16 to normal position and rack rod 18 connected therewith, pawl 22 engages the teeth of and rotates to the right ratchet wheel 23 and shaft 21 to which it is keyed.

Shaft 21 is journaled in the casing 24 attached to slack adjusting cylinder 15 which is suspended by movable hanger rods from the bottom of the car floor and at a convenient location near its side and also passes through and is supported by frame 25, the construction of which frame is shown more clearly in Fig. 2, and keyed to shaft 21 inside of frame 25 is a bevel or miter gear 26 which engages gear 27 which latter gear is a part of or is keyed to turnbuckle 28 the ends of which are journaled in the frame 25 and also have threaded engagement with the disconnected ends of brake lever rod 29.

The rotation of the shaft 21 to the right as heretofore explained causes movement of gear 26 and consequent movement of gear 27 and turnbuckle 28 working on brake lever rod 29 by means of right and left hand threads thereby shortening this rod, the effect of which is to draw levers 30 and 31 closer together thereby automatically taking up slack caused by wear of connections and brake shoes.

It will be seen that when piston 16 and rack rod 18 connected therewith have reached their normal position, pawl 22 comes in contact with stop 36 attached to casing 24 and is thereby disengaged from ratchet wheel 23 leaving rod 21 free to be turned by hand by means of a suitable crank 36 adapted to be used when necessary to release slack upon application of new brake shoes.

By referring to Figs. 5 and 6 it will be noted there are hangers 32 attached to the bottom of the car floor from which depend rods 33 at the bottom of which are pins or bolts 34 passing through lugs 35 on casing 24 and cylinder 15 thus providing for any swinging motion which might be necessary on account of longitudinal movement of frame 25 and consequent movement of shaft 21 which would be encountered in the application and release of brakes.

The operation of taking up slack at one side of the brake rigging will be fully understood by reference to Fig. 4 which shows air brake cylinder 11, slack adjusting cylinder 15, casing 24 and shaft 21 as described in the preceding figures. Shaft 21 is journaled in casing 25ᵃ which is attached to the head of brake cylinder 11 or may be attached to the end of the reservoir placed in conjunction with the brake cylinder or said casing or frame 25ᵃ may be suspended from the car floor as may be convenient. When shaft 21 is turned to the right gear 26 is also turned causing movement of gear 27 attached to or a part of a sleeve 28ᵃ which is journaled in casing 25ᵃ and has threaded engagement with rod 29ᵃ. The sleeve 28ᵃ when turned as above explained draws rod 29ᵃ and the end of lever 30 nearer to the air brake cylinder or frame 25ᵃ by means of said threaded engagement of shaft 29ᵃ, thereby shortening up the slack. It is thus apparent that slack will be taken up automatically in the combination set forth, and it is also obvious that by simply eliminating the rack 18 and coöperating parts, a convenient and practical method of manual slack adjustment is provided.

Having described the working of my invention, what is claimed to be new and desired to be covered by Letters Patent is as follows:

1. In combination, a brake cylinder and piston therein, brake levers, and operative brake connections therefor, all associated with the cylinder, and slack adjusting means comprising an adjusting member coöperating with said brake levers, a slack adjusting cylinder and piston therein, an operative connection between the last mentioned piston and the adjusting member, means for conducting the pressure medium from the brake cylinder to the slack adjusting cylinder to act on the piston of the latter, and means supporting the slack adjusting cylinder and permitting bodily movement of the latter.

2. In a slack adjuster, the combination with brake rigging and slack adjusting means therefor, of a piston connected to actuate said slack adjusting means, a cylinder for said piston, pressure supply means for the cylinder, and a movable support for the cylinder adapted to permit the cylinder to move relative to adjustments of slack.

WILLIAM Y. MOFFAT.

Witnesses:
FRANK J. JORDAN,
JOHN R. WART.